Dec. 25, 1934.  A. ROSNER  1,985,645

DRIVING MECHANISM

Filed May 5, 1931

INVENTOR.
ADOLPH ROSNER
BY Warren T. Hunt
ATTORNEY

Patented Dec. 25, 1934

1,985,645

UNITED STATES PATENT OFFICE 1,985,645

DRIVING MECHANISM

Adolph Rosner, Rockton, Ill., assignor to Bendix Research Corporation, South Bend, Ind., a corporation of Indiana Application May 5, 1931, Serial No. 535,176

3 Claims. (Cl. 74—206)

This invention relates to roller transmission gears and more particularly to roller gears which are adapted to the transmission of power at relatively different speeds.

An important object of the invention is to provide a roller gear in which relative sliding movement of the component parts is eliminated.

Another object of the invention is to provide a roller gear in which the driving and driven members contact the friction rollers with a substantial force.

Another object of the invention is to provide a roller gear in which the friction rollers are arranged symmetrically about the gear axis and balance the thrust forces.

An important feature of the invention relates to the concentric arrangement of the driving and driven parts and the interposition of a compression member between the outer member and the rollers whereby the member presses the rollers into driving relation with the component parts.

Another feature of the invention relates to the compression member which preferably contacts with a pair of rollers arranged on opposite sides of one of the power transmission members, with a force sufficient to distort the member slightly, thereby insuring a driving relation between the driving and driven members.

Another feature of the invention relates to the driving engagement of the compression ring whereby distortion of the ring does not distort its complementary engaging member.

A better understanding of the invention may be had by referring to the following description in connection with which I have illustrated a preferred embodiment of the invention in the accompanying drawing, in which.

Figures 1, 2, 3:
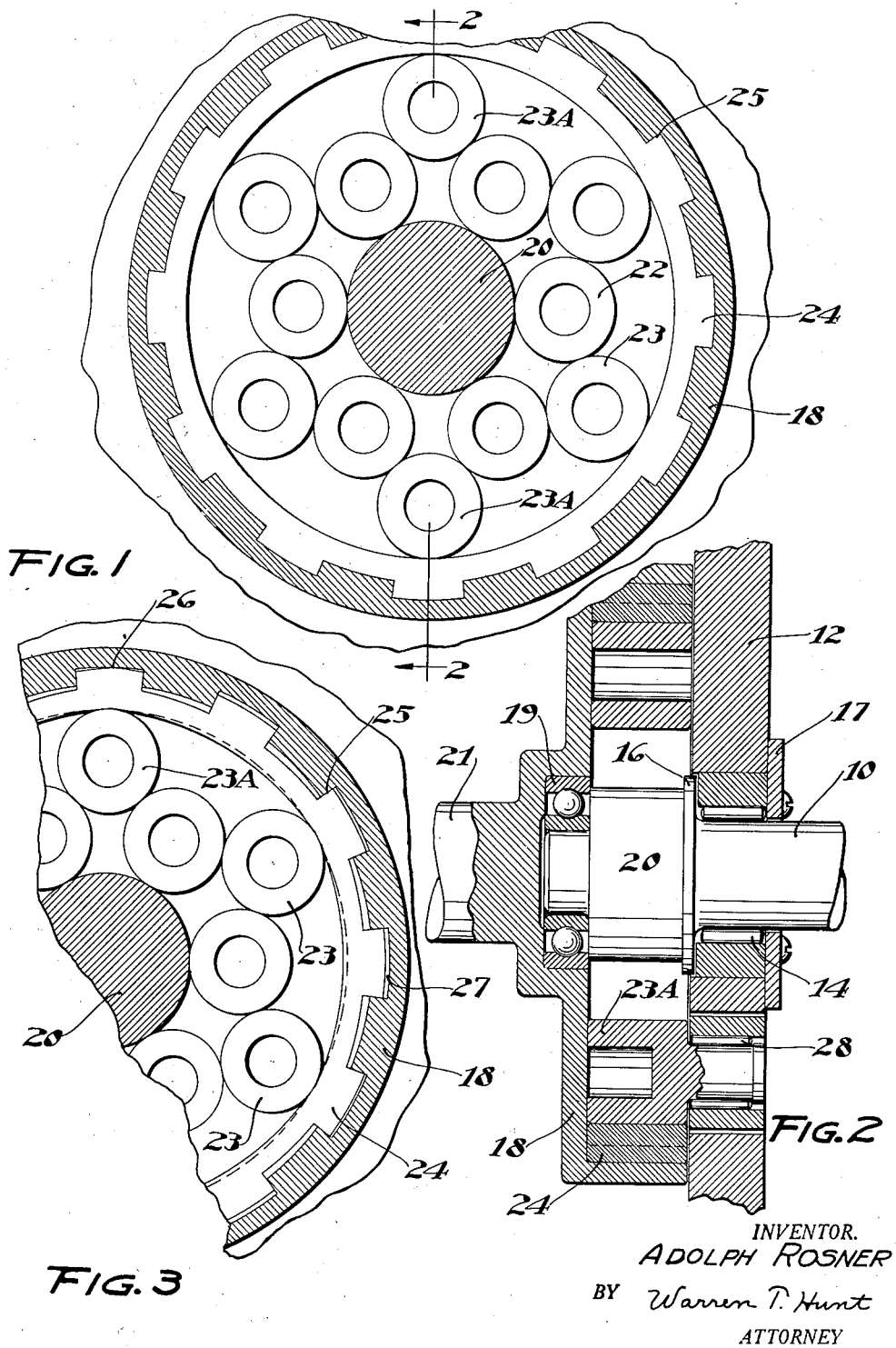
Figure 1 is a elevational sectional view showing the parts in their assembled relation.
Figure 2 is a sectional view taken on line 2—2 of Figure 1.
Figure 3 is a view similar to Figure 2 in which the distortion of the compression member has been exaggerated to better illustrate the action.

In the drawing, 10 is a driving shaft rotatably mounted in a support 12 by bearings 14 and held against axial movement by flange 16 and collar 17. The shaft 10 is piloted within the driven member 18 by a bearing 19. Driven member 18 is concentric with the enlarged cylindrical portion 20 of the driving shaft 10 and is integral with a shaft 21 through which the gear may be connected to a machine (not shown).

Contacting the cylindrical part 20 is a series of spaced friction rollers 22 and outwardly of which is a second series of rollers 23 and 23A, which contact with rollers 22 and the inner face of compression member 24. Each series preferably includes an even number of rollers, the rollers 22 being of the same size. The outer series of rollers preferably includes two rollers 23A, of a somewhat larger size than rollers 23, and which because of the even number of rollers, may be located on opposite sides of the driven member 20. Compression member 24 is preferably constructed with its normal diameter slightly less than the over-all dimension of the assembly as measured through rollers 23A, whereby in the assembled relation, compression member 24 is distorted slightly, and forces rollers 23A toward the center of the shaft 20 and causes all of the rollers to frictionally engage each other and the driving member 20.

Compression member 24 forms the friction face of the driven member 18, and is in driving engagement therewith by means of splines 25 which have a sliding engagement with complementary faces in member 24 and move radially thereof during its rotation.

The operation of the gear may be understood by referring to Figure 3 wherein the distortion of compression member 24 has been exaggerated and it may be noted that the outer portion of the spline opposite roller 23A is bottomed in its corresponding groove at 26, while the spline intermediate the rollers 23 has moved slightly inwardly as shown at 27 without distorting the driven member 18 which may be made as rigid as desired for the proper transmission of the power. At least one of the rollers 23A is preferably pivotally mounted on a fixed support by any desired means, such as bearing 28, for taking the torque reaction of the rollers.

It may be readily seen by the foregoing description that I have provided a roller transmission gear in which the driving and driven parts are concentric and in which the rollers are forced inwardly by a distortable member that exerts pressure on opposite sides of the gear axis and thereby balances the radial thrust. It will be understood that the arrangement of driving and driven parts may be reversed, and that the ratio between them is equal to the ratio of the diameter of shaft 20 to the inner diameter of the member 24.

While I have illustrated and described a preferred embodiment of the invention, it is understood that this showing and description are illustrative only, and that I do not regard the invention as limited to the forms shown and described, or otherwise, except by the terms of the following claims.

I claim:

1. A roller transmission gear comprising driving and driven shafts, friction means connecting the shafts including a series of rollers arranged to have their overall dimensions define an ellipse, a normally circular resilient metallic member surrounding said rollers and distorted thereby into a corresponding ellipse, said member having a splined connection with one shaft including projections having parallel sides mating with corresponding grooves having parallel sides, and said splined connection being adapted to permit radial movement of a portion of the metallic member relative to the shaft.

2. A roller transmission gear comprising inner and outer concentric members, friction driving means connecting the members including a plurality of rollers frictionally contacting the inner member additional rollers contacting the first rollers and arranged to have their overall dimensions define an ellipse, a normally circular resilient metallic member surrounding the rollers and distorted thereby to contact the rollers, said distorted member having a radially slidable driving connection with the outer member and said driving connection including splines on the distorted member, said splines having parallel sides in mesh with similar parallel sided splines on the outer member to maintain substantially constant driving clearance between the distorted member and the outer member irrespective of the amount of distortion of the resilient member.

3. A roller transmission gear comprising driving and driven shafts, friction means connecting the shafts including a series of rollers arranged to have their overall dimensions define an ellipse, a normally circular resilient metallic member surrounding said rollers and distorted thereby into a corresponding ellipse, said member having a splined connection with one shaft including projections having parallel sides, said spline connection being adapted to permit radial movement of a portion of the metallic member relative to the shaft, and means for holding said shafts in fixed concentric position.

ADOLPH ROSNER.